(12) United States Patent
Fabian

(10) Patent No.: US 7,133,591 B2
(45) Date of Patent: Nov. 7, 2006

(54) JACKET TUBE MADE OF SYNTHETICALLY PRODUCED QUARTZ GLASS AND OPTICAL FIBRES PRODUCED USING SAID JACKET TUBE

(75) Inventor: Heinz Fabian, Grossostheim (DE)

(73) Assignee: Heraeus Tenevo GmbH, Hanau (DE)

( * ) Notice: Subject to any disclaimer, the term of this patent is extended or adjusted under 35 U.S.C. 154(b) by 0 days.

(21) Appl. No.: 10/517,330

(22) PCT Filed: Mar. 27, 2003

(86) PCT No.: PCT/EP03/03217

§ 371 (c)(1),
(2), (4) Date: Dec. 9, 2004

(87) PCT Pub. No.: WO03/104154

PCT Pub. Date: Dec. 18, 2003

(65) Prior Publication Data

US 2005/0232571 A1    Oct. 20, 2005

(30) Foreign Application Priority Data

Jun. 10, 2002   (DE) .............................. 102 25 773

(51) Int. Cl.
*G02B 6/02*   (2006.01)
(52) U.S. Cl. ................. 385/126; 385/127; 385/141; 385/144
(58) Field of Classification Search ............... 385/123, 385/126, 127, 128, 141, 144
See application file for complete search history.

(56) References Cited

U.S. PATENT DOCUMENTS

| | | | | |
|---|---|---|---|---|
| 4,038,370 A * | 7/1977 | Tokimoto et al. | ............ | 423/336 |
| 4,165,915 A * | 8/1979 | Rau et al. | ................... | 385/142 |
| 4,235,615 A * | 11/1980 | Rau et al. | ...................... | 65/398 |
| 4,675,040 A | 6/1987 | Tanaka et al. | ............. | 65/13.12 |
| 6,672,107 B1 * | 1/2004 | Werdecker et al. | .......... | 65/17.4 |
| 2003/0041623 A1 * | 3/2003 | Werdecker et al. | .......... | 65/17.6 |
| 2003/0140659 A1 | 7/2003 | Fabian | ........................ | 65/412 |

FOREIGN PATENT DOCUMENTS

| | | | | |
|---|---|---|---|---|
| DE | 195 36 960 A1 | 3/1996 | ............. | 385/141 X |
| DE | 100 25 176 A1 | 12/2001 | | |
| EP | 0 887 670 A | 12/1998 | ............. | 385/141 X |
| EP | 0 972 752 A | 1/2000 | ............. | 385/141 X |
| WO | WO 01/90010 | 11/2001 | | |

* cited by examiner

*Primary Examiner*—Brian M. Healy
(74) *Attorney, Agent, or Firm*—Tiajoloff & Kelly

(57) ABSTRACT

Jacket tubes of synthetically produced quartz glass as a semi-finished product for producing an outer cladding glass layer of an optical fiber are generally known. The invention relates to an improvement of a jacket tube in terms of inexpensive producibility and of suitability as a semi-finished product for optical fibers having a low optical attenuation. According to the invention this object is achieved by a jacket tube in which the quartz glass has a content of metastable OH groups of less than 0.05 wt ppm and a content of anneal-stable OH groups of less than 0.05 wt ppm.

9 Claims, 1 Drawing Sheet

JACKET TUBE MADE OF SYNTHETICALLY PRODUCED QUARTZ GLASS AND OPTICAL FIBRES PRODUCED USING SAID JACKET TUBE

BACKGROUND OF THE INVENTION

The present invention relates to a jacket tube made of synthetically produced quartz glass as a semi-finished product for producing an outer cladding glass layer of an optical fiber.

Furthermore, the present invention relates to an optical fiber produced by using the jacket tube, comprising a core with a diameter $d_K$ and a first cladding region cladding the core and having an outer diameter $d_M$, and a second cladding region cladding the first cladding region, the ratio of $d_M/d_K$ being at least 2.5.

Optical fiber preforms for commercial applications are substantially produced according to the known OVD (outside vapor deposition) MCVD (modified chemical vapor deposition), PCVD (plasma-induced chemical vapor deposition) and VAD (vapor axial deposition) methods. In these methods, a core rod is first produced, which substantially forms the core and the optically effective part of the cladding of the later optical fiber. The optically effective cladding region of the optical fiber will be called "inner cladding" in the following.

Typical diameter ratios of core rod to core diameter are between 2 and 5. Said diameter ratio is known as the so-called "dm/$d_K$ ratio", where $d_M$ is the diameter of the core rod and $d_K$ the diameter of the core. Since commercially used single-mode optical fibers have typical core diameters of about 8 μm to 9 μm and a fiber diameter of 125 μm, further quartz glass must be applied to the core rod to achieve said geometrical ratios. Said further quartz glass forms an "outer cladding" of the fiber and is also called "jacket".

At a typical $d_M/d_K$ ratio of 4, the core rod contributes barely 10% to the whole fiber cross-section; the remaining 90% derive from the jacket material. For optimizing the costs of preform production, the costs for producing and applying the jacket material are therefore of central importance. So far it has generally been believed that the quality of the jacket material is of essential importance to the mechanical strength of the later optical fiber whereas the influence on the optical properties has so far been considered to be small.

The jacket material is normally provided in the form of an overcladding tube of quartz glass or of porous $SiO_2$ soot material that prior to fiber drawing or during fiber drawing is collapsed onto the optical cladding.

A method for producing a quartz glass preform for so-called single-mode fibers using a jacket tube of the generic type and a fiber of the above-mentioned kind are known from U.S. Pat. No. 4,675,040. In a first step of the method, a core rod is produced by cladding a rod of core glass with a cladding tube and fusing the same. The core of the core rod produced in this way has a diameter of 8 mm and is clad with an inner cladding having a smaller refractive index, the difference of the refractive indices being indicated as Δ=0.30. In a second step of the method, the core rod is overclad by a jacket tube of undoped quartz glass in that said tube is collapsed onto the core rod. The complex of core rod and overcladding tube forms a quartz glass preform from which the single-mode fiber is subsequently drawn.

In this method the jacket material is provided in the form of an overcladding tube of quartz glass. In the case of synthetic quartz glass the jacket tube is normally produced by the measure that a silicon compound, such as $SiCl_4$, is oxidized or hydrolyzed with formation of $SiO_2$ particles and the $SiO_2$ particles are deposited in layers onto a carrier rod. The carrier rod is subsequently removed, and the resulting tube of porous soot material is densely sintered.

It has been found that the known jacket tubes no longer satisfy the increasing demands made on the optical qualities of optical fibers, particularly single-mode fibers, in an unrestricted way. Especially with the increasing technical importance of single-mode fibers having very low OH contents (attenuation at 1385 nm<0.34 dB/km), the jacket material gains more and more importance with respect to the optical properties.

SUMMARY OF THE INVENTION

It is the object of the present invention to provide a jacket tube which can be produced at low costs on the one hand and which can be used for producing optical fibers with low optical attenuation on the other hand.

Furthermore, it is the object of the present invention to provide an optical fiber which can be produced at low costs and which has a predetermined attenuation portion in a reproducible manner in the range of the absorptions caused by OH groups. As for the jacket tube, this object, starting from the above-mentioned jacket tube, is achieved according to the invention in that the quartz glass of the jacket tube has a content of metastable OH groups of less than 0.05 wt ppm and a content of anneal-stable OH groups of at least 0.05 wt ppm.

A jacket tube within the meaning of this invention is a tube of quartz glass that is used for cladding a so-called core rod.

The OH group content (hydroxyl group content) of synthetically produced quartz glass is composed of chemically firmly bound OH groups which cannot be removed by annealing the quartz glass, and of chemically less firmly bound OH groups which can be "annealed out" of the quartz glass by way of an annealing treatment. The last-mentioned species of hydroxyl groups will be called "metastable OH groups" in the following, and the first-mentioned species will be called "anneal-stable OH groups".

DETAILED DESCRIPTION OF THE INVENTION

Figure 1:
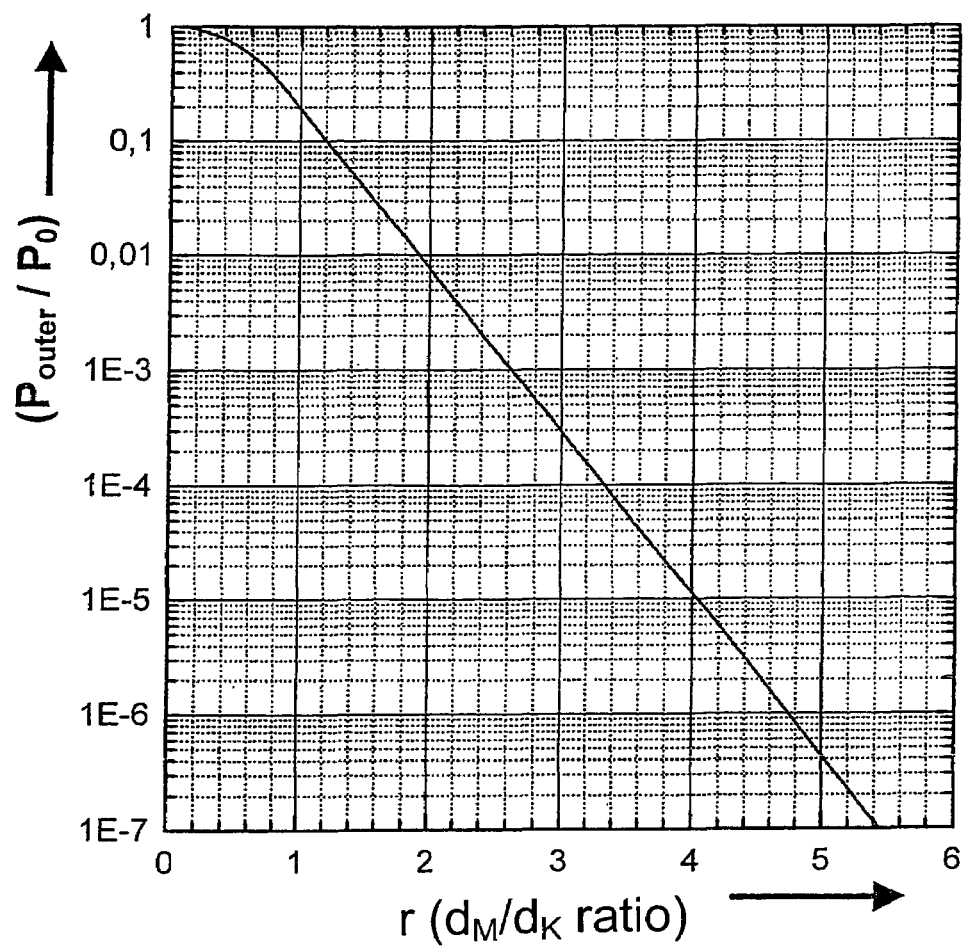
FIG. 1 is a graph of the guided light intensity (Pouter/P0) in response to the fiber radius.

The jacket tube of the invention is optimized with respect to the two species of OH groups, which will be explained in more detail in the following:

1. It has been found that a certain content of OH groups can reduce the transportation of impurities in the quartz glass (specifically by diffusion during the fiber drawing process). This result is surprising because hydroxyl-containing quartz glass has a lower viscosity in comparison with hydroxyl-free quartz glass, which normally facilitates the diffusion of impurities into quartz glass at high temperatures.

However, it has also been found that this diffusion-inhibiting effect of the OH groups cannot definitely be correlated with the total hydroxyl group content of the quartz glass. It has been found that only the chemically firmly bound, anneal-stable OH groups efficiently prevent the transportation of impurities into quartz glass, whereas the metastable OH groups are inefficient in this respect. Possibly, this advantageous effect of the anneal-stable OH groups is due to the fact that these are capable of retaining the impurities in the jacket tube or inside the outer cladding region of the fiber due to chemical bonding or that existing defects or defects formed during fiber drawing are saturated by hydrogen or OH groups and are thus no longer available for a transport mechanism for impurities.

The jacket tube of the invention therefore consists of synthetic quartz glass having a concentration of anneal-stable OH groups of at least 0.05 wt ppm. Within the meaning of this invention, the content of anneal-stable OH groups is defined as the OH content that after heating of a component with a thickness of not more than 10 mm remains in the quartz glass component (diffusion length≦5 mm) if heating is carried out at a temperature of 1040° C. for a period of 48 hours and with inert gas flushing.

Anneal-stable OH groups can only be removed from quartz glass by taking great technical efforts. A content of anneal-stable OH groups of 0.05 wt ppm or more is adjustable with reasonable efforts.

The inventive jacket tube of synthetic quartz glass is thus characterized in that in the temperature and deformation processes typical of fiber drawing said tube only discharges a small amount of impurities towards the optical cladding and the core of the fiber and that it can be produced at low costs.

2. When the fiber design is known, it is possible to calculate the influence of OH groups on optical attenuation, the OH groups being contained in the cladding region of the fiber. As a rule, the intensity of the radiation guided in the optical fiber decreases exponentially from the fiber core to the outside in response to the fiber design. The amount of the guided light intensity ($P_{outer}/P_0$) in response to the fiber radius (standardized to the $d_M/d_K$ ratio) can be inferred from the diagram of FIG. 1 for a standard single-mode fiber. As can be seen, the guided light intensity rapidly decreases with an increasing distance from the core-cladding interface ($d_M/D_K$ ratio=1). For instance, the amount of the light intensity at a distance from the fiber core that corresponds to a $d_M/d_K$ ratio of 2.5 is only about 1/1000 of the light intensity in the fiber center ($d_M/d_K$ ratio=0).

On the basis of the formula $$\alpha_{1385}[dB/km] \leq \frac{P_{outer}(r_0)}{P_0} \times 62.7 \, \frac{dB}{km \cdot ppm} \times conc._{OH}(r > r_0)$$

it is possible to determine the attenuation amount ($\alpha_{1385}$) at a wavelength of 1385 nm from the intensity ratio at each point of the cladding region ($P_{outer}(r_0)/P_0$), the attenuation amount following from a known concentration of OH groups (conc.$_{OH}$) in the respective cladding region ($r > r_0$). On the basis of this calculation the still acceptable OH content of the respective cladding region has to be determined. It is a standard procedure among the experts to calculate the still acceptable OH content in the cladding on the basis of the intensity profile known for the respective fiber and in consideration of the demand made on the quality of the optical fiber, and to produce a corresponding quartz glass which has an OH content with or below said still acceptable maximum content.

Surprisingly, however, it has been found that OH groups in the jacket tube may have an adverse effect on the attenuation of the optical fiber beyond the theoretically calculated contribution. Even at OH contents clearly below the arithmetically determined and still acceptable maximum content of OH groups, excessive OH group absorptions occurred. Furthermore, it was found that this effect, too, cannot definitely be correlated with the total hydroxyl group content of the quartz glass and is also hardly reproducible. It was found that this low reproducibility is correlated with the chemically insignificantly bound metastable OH groups. A possible explanation for the fact that the theoretical calculation of the influence of the OH groups on the optical fiber attenuation may lead to wrong results is that metastable OH groups diffuse due to their mobility during a hot treatment into regions closer to the core where they contribute, on account of the higher intensity of the guided light, to a much stronger absorption than in the cladding region which is remote from the core and from which they derive. In this respect the fiber drawing process is particularly critical because at temperatures around 2000° C., which are typical of fiber drawing, the diffusion paths existing in a fiber with respect to the core are short, e.g. in a single-mode fiber they are less than 62 µm. Evidently, the metastable OH groups can easily bridge said paths, whereas anneal-stable OH groups are harmless in this respect.

The present invention is thus based on the finding that the still acceptable attenuation portion by OH group absorption must only be occupied by anneal-stable OH groups in the jacket material, but not by metastable OH groups. The still acceptable attenuation portion does therefore not define the upper limit for the total hydroxyl group content in the jacket tube (as has so far been the case), but according to the invention the upper limit for the content of anneal-stable OH groups in the jacket material, whereas the content of metastable OH groups is ideally zero.

Therefore, the inventive jacket tube consists of synthetic quartz glass having a concentration of metastable OH groups of not more than 0.05 wt ppm. Within the meaning of this invention the content of metastable OH groups is defined as that OH content that is expelled out of a component made of the quartz glass with a thickness of not more than 10 mm by heating to a temperature of 1040° C. for a period of 48 hours with inert gas flushing.

Metastable OH groups can be expelled by an annealing process, as indicated in the above definition, relatively easily from the quartz glass. To keep the content of metastable OH groups in the quartz glass as small as possible, the presence and incorporation of metastable OH groups may also be avoided or suppressed in a preventive way during the manufacturing process of the jacket tube. On the assumption that the formation of metastable OH groups is accompanied by the offer of hydrogen or hydrogen-containing compounds during the manufacturing process of the jacket tube, a suitable possibility consists, for instance, in largely avoiding hydrogen or hydrogen-containing compounds, especially in hot processes which the quartz glass is subjected to in the course of the manufacturing process. Other possibilities of actively eliminating metastable OH groups from quartz glass follow from the chemical procedure during the manufacturing process. Drying processes using gaseous drying agents (halogens) should here be mentioned by way of example, such processes reducing not only the content of metastable OH groups, but also the content of anneal-stable OH groups.

It is essential that the content of metastable OH groups in the quartz glass of the jacket tube can be kept low or set to a small value in a relatively inexpensive way. Since it is only the metastable OH content that poses problems with respect to the diffusion of the OH groups, the inventive jacket tube of synthetic quartz glass is thus also characterized in that despite the inexpensive production in the temperature and deformation processes typical of fiber drawing it discharges only a little amount of OH groups towards the optical cladding and the core of the fiber.

It has turned out to be particularly advantageous when the quartz glass has a content of metastable OH groups of less than 0.01 wt ppm. The probability that OH groups pass into the optically particularly relevant region of the fiber and effect absorption at said place decreases with a decreasing content of metastable OH groups.

As has already been explained at the outset, the content of anneal-stable OH groups is set to be as high as possible to profit, on the one hand, from the more economic way of production and from the positive effect on the transportation of impurities of an OH-rich quartz glass. On the other hand, anneal-stable OH groups in the cladding region of the fiber also contribute to an absorption of the guided light wave. As a consequence, this yields an upper limit for the content of anneal-stable OH groups that is defined by the attenuation portion caused by the OH groups in the optical fiber. The intensity of the radiation guided in the fiber decreases exponentially to the outside in the cladding region. The further the quartz glass provided by the jacket tube is away from the fiber core, the higher is the still acceptable OH content. A measure of this distance of the jacket tube material from the fiber core is the so-called $d_M/d_K$ ratio. The smaller this ratio is the closer will the jacket tube move to the fiber core and the lower is the still acceptable content of anneal-stable OH groups.

Depending on the demand made on the optical quality of the fiber and in response to the distance of the jacket tube material from the fiber core, the inventive jacket tube advantageously consists of quartz glass having a content of anneal-stable OH groups of not more than 5 wt ppm, preferably a content of anneal-stable OH groups of not more than 1 wt ppm, and particularly preferably a content of anneal-stable OH groups of not more than 0.5 wt ppm.

Such a jacket tube can preferably be used at a $d_M/d_K$ ratio in the range between 2.5 and 8 without the content of anneal-stable OH groups having an inadmissible effect on fiber attenuation. Metastable OH groups diffuse at the high fiber drawing temperatures in the quartz glass, thereby causing a certain attenuation portion. Apart from this, metastable OH groups in the cladding of the fiber have the same effect as anneal-stable OH groups in the cladding of the fiber with respect to the absorption caused thereby. The above observations regarding the maximum content of anneal-stable OH groups in dependence upon the $d_M/d_K$ ratio are thus equally applicable to the total content of OH groups, namely of metastable OH groups and anneal-stable OH groups.

With respect to the above-described diffusion-inhibiting "getter effect" of the anneal-stable OH groups relative to the impurities existing in the quartz glass, it has turned out to be useful when the quartz glass of the jacket tube has a content of anneal-stable OH groups of at least 0.1 wt ppm, preferably at least 0.3 wt ppm.

The inventive jacket tube made of synthetically produced quartz glass is either used for producing a preform therefrom, from which preform the optical fiber is drawn, or it is collapsed in coaxial arrangement with a so-called "core rod" having a core glass enveloped by an inner cladding onto the rod during the fiber drawing process. The last-mentioned process is called "ODD method" (overclad during drawing) in the literature. In the case of an application for producing a preform and also in the case of an application in an ODD method, an inventive jacket tube is used for producing the necessary material, or several jacket tubes according to the invention are used for this purpose.

In a preferred embodiment, the jacket tube has a ratio of outer diameter to inner diameter ranging from 2 to 8, preferably from 4 to 6. Such a jacket tube is suited because of its wall thickness and the relatively small inner diameter to apply the whole necessary cladding material (outer cladding) of a fiber. The provision of the whole outer cladding in the form of a single jacket tube has mainly economic advantages because the tube can be produced in one operation, and interfaces in the cladding region are avoided As for the optical fiber, the above-indicated object starting from a generic fiber is achieved according to the invention in that the second cladding region consists of synthetic quartz glass which is obtained by elongating a jacket tube according to the invention.

The jacket tube according to the invention is preferably used for cladding a core rod having a core with a diameter $d_K$ and a cladding which envelopes the core and has an outer diameter $d_M$, with the proviso that the ratio of $d_M/d_K$ is at least 2.5 and preferably ranges between 3 and 6. The jacket tube is here collapsed onto the core rod, or it is elongated in a coaxial arrangement with a core rod in an ODD method directly into a strand or fiber.

The low metastable OH content of the jacket tube prevents the diffusion of mobile OH groups in near-core regions due to high temperatures during collapsing, elongation and particularly during fiber drawing, and an optical attenuation is achieved in the range of the OH group absorption and is reproducible within the predetermined specification.

Moreover, the content of anneal-stable OH groups reduces the diffusion of other impurities during the said hot processes and, in this respect, has even an advantageous effect on fiber attenuation.

The invention will now be explained in more detail with reference to embodiments.

EXAMPLE 1

Deposition Process

A porous soot body is produced by outside deposition using a standard OVD method without addition of a dopant. To this end soot particles are deposited in layers on a carrier rotating about its longitudinal axis by reciprocating a number of parallel deposition burners, each of the deposition burners being fed with $SiCl_4$, and $SiCl_4$ being hydrolyzed in a burner flame in the presence of oxygen into $SiO_2$.

Dehydration Treatment

After the deposition method has been completed and the carrier removed, a soot tube is obtained that is subjected to a dehydration treatment for removing hydroxyl groups introduced due to the production process. To this end the soot tube is introduced in vertical orientation into a dehydration furnace and is first treated at a temperature in the range of 800° C. to about 900° C. in a chlorine-containing atmosphere. The treatment lasts for six hours. This yields a hydroxyl group concentration of about 0.45 wt ppm.

Vitrification

The soot tube treated in this way is vitrified in a vitrification furnace at a temperature in the range of about 1350° C., resulting in a jacket tube with the desired wall thickness that invariably has a homogeneous OH content of about 0.45 wt ppm over the radial cross-section.

Forming, Treating and Sample Production

The outer wall of the jacket tube produced in this way from synthetic quartz glass is coarse-ground by means of a peripheral grinder equipped with a #80 grinding stone, whereby the predetermined desired outside diameter is substantially obtained. The inner surface is polished by means of a honing machine equipped with a #80 grinding stone. The degree of polish is continuously increased by the grinding stones being exchanged, the final treatment being carried out with a #800 grinding stone.

The outside of the jacket tube is then ground by means of an NC peripheral grinder. After it has been made sure that the jacket tube is produced with a wall thickness within a predetermined tolerance range, a measurement sample is separated from the jacket tube, in the form of an annular disk having a thickness of 10 mm, on the basis of which the content of anneal-stable OH groups is then determined in the quartz glass. The jacket tube and the annular disk are then etched in a hydrofluoric acid-containing etching solution for a short period of time.

The jacket tube has an outer diameter of 150 mm and an inner diameter of 50 mm and a length of 2500 mm.

Annealing Treatment

For further reducing the content of metastable OH groups, the jacket tube is subjected to an annealing treatment at a temperature of 1040° C. for a period of 200 hours with nitrogen flushing. With a known diffusion coefficient of the metastable OH groups in the quartz glass, it would be possible to arithmetically determine the content thereof in the jacket tube after the annealing treatment. As will be explained in more detail in the following, the annular disk is used in the embodiment for this purpose in that said annular disk is subjected to the same pretreatment as the jacket tube.

Results of the Measurements of the OH Content

Subsequently, the OH contents are determined by spectroscopy in the jacket tube and in the measurement sample in that measurements are each time carried out over the whole wall thickness of about 50 mm. The measurement place in the jacket tube is here in the center with respect to the two tube ends. The measurement results are indicated in Table 1.

Since in terms of spectroscopy a distinction cannot be made between metastable OH groups and anneal-stable OH groups, the result of the measurement as taken shows the total content of OH groups in the jacket tube and in the annular disk, each averaged over the wall thickness. Due to the increased diffusion length, the jacket tube (with a diffusion path of about 25 mm) has at 0.35 wt ppm a slightly higher total content of OH groups than the annular disk (with a diffusion path of 5 mm).

By comparison, the OH content of the annular disk could be lowered to 0.32 wt ppm. Since the annular disk after the anneal treatment according to the above definition of the metastable OH content (temperature=1040° C., treatment period>48 h, diffusion path<5 mm, inert gas flushing) no longer contains any measurable content of metastable OH groups, the measured OH content of 0.32 wt ppm must be completely present in the form of anneal-stable OH groups. Since anneal-stable OH groups cannot be eliminated by annealing, this means that the jacket tube also has a mean content of anneal-stable OH groups of 0.32 wt ppm and that the difference with respect to the total content of OH groups measured in the jacket tube indicates the content of metastable OH groups still present in the jacket tube, the content being thus at 0.03 wt ppm.

Hence, it has been found that with the dehydration treatment and with a reasonable amount of energy and time spent in the quartz glass of the jacket tube, it is possible to adjust a total hydroxyl group content which, on the one hand, has a content of anneal-stable OH groups that is not too high, but adequate, and from which, on the other hand, metastable OH groups can be removed by an additional annealing treatment to such an extent that an optical fiber with low attenuation can be produced using the jacket tube.

Use of the Jacket Tube According to the Invention

The jacket tube according to the invention is used for producing an optical fiber in that the jacket tube with an inner diameter of 50 mm is collapsed during fiber drawing in an ODD method onto a core rod produced according to the MCVD method, which has a core having a diameter $d_K$ and a cladding enveloping the core (including the substrate tube portion) with an outer diameter $d_M$, the ratio of $d_M/d_K$ being 4.0. The core rod is here inserted into the jacket tube and fixed therein such that its central axis coincides with that of the jacket tube. The two ends of the complex obtained in this way are connected to a dummy material of quartz glass, and the complex is introduced into a vertically oriented and electrically heated fiber drawing furnace from the top side and softened zonewise, starting with the lower end, at a temperature around 2180° C., and a fiber with an outer diameter of 125 μm is drawn from the softened area. A negative pressure ranging from 200 mm to 1000 mmAq is maintained in the gap remaining between core rod and quartz glass cylinder.

The resulting optical fiber having a diameter of 125 μm is characterized by an optical attenuation around 0.30 dB/km at a wavelength of 1.385 μm.

EXAMPLE 2

Comparative Example with Respect to Example 1

A porous soot body is produced by outside deposition according to Example 1; it is dehydrated, vitrified, formed and surface-treated. The resulting jacket tube has an outer diameter of 150 mm and an inner diameter of 50 mm and a length of 2500 mm. An annular sample is taken from the jacket tube in accordance with Example 1. The measurements of the OH content in the quartz glass of the jacket tube and in the annular disk yield a homogenous OH content of about 0.45 wt ppm over the radial cross-section in each instance. The annular disk is then subjected to the annealing treatment indicated in Example 1, but not the jacket tube.

Results of the Measurements of the OH Content

Due to the annealing treatment the OH content of the annular disk could be lowered to 0.32 wt ppm. Since the annular disk no longer contains a measurable content of metastable OH groups after the annealing treatment according to the above definition of the metastable OH content (temperature=1040° C., treatment duration>48 h, diffusion path≦5 mm, inert gas flushing), the measured OH content of 0.32 wt ppm must be completely present in the form of anneal-stable OH groups. Since anneal-stable OH groups cannot be eliminated by annealing, the difference with respect to the total hydroxyl group content prior to annealing (0.45 wt ppm) indicates the content of metastable OH groups removed by annealing. Hence, this value amounting to 0.13 wt ppm corresponds to the content of metastable OH groups in the non-annealed jacket tube.

Use of the Jacket Tube

The jacket tube according to Example 2 is used in the same way as the one described above with reference to Example 1 as a semi-finished product for producing an optical fiber by collapsing it in an ODD method onto a core rod, which corresponds to that of Example 1. The residual cladding material is provided by the jacket tube. The resulting optical fiber with a diameter of 125 μm has an optical attenuation of less than 0.43 dB/km at a wavelength of 1.385 μm.

EXAMPLE 3

Deposition Process

A porous soot body is produced by flame hydrolysis of $SiCl_4$ without addition of a dopant by means of the OVD method, as described with reference to Example 1. After the deposition method has been completed, the carrier rod is removed. A transparent jacket tube is produced from the resulting soot tube, which has a density of about 25% of the density of quartz glass, namely on the basis of the method explained by way of example hereinafter.

Dehydration Method

The soot tube is subjected to a dehydration treatment for removing hydroxyl groups introduced by the manufacturing process. To this end the soot tube is introduced in vertical orientation into a dehydration furnace and is first treated at a temperature of around 850° C. in a chlorine-containing atmosphere. The treatment lasts for about six hours. Subsequently, the total concentration of hydroxyl groups in the soot tube is less than 1 wt ppm.

Pretreatment

The soot body is then introduced into a vitrification furnace with a vertically oriented longitudinal axis and is exposed to the open atmosphere—though for a short period of time only. The soot tube is thereby contaminated again with hydroxyl groups which can pass into the quartz glass and form metastable OH groups therein. To eliminate metastable OH groups, the soot tube is subjected to a pretreatment inside the vitrification furnace.

To this end the vitrification furnace is first flushed with nitrogen, the internal pressure of the furnace is reduced to 0.1 mbar, and the furnace is then heated. The soot tube is supplied continuously from the top to the bottom, starting with the lower end, to the heating element (length: 600 mm) at a feed rate of 10 mm/min. At a temperature of the heating element of 1200° C. a maximum temperature of about 1180° C. is observed on the surface of the soot tube. The internal pressure inside the vitrification furnace is kept at 0.1 mbar by continuous evacuation.

On account of this zonewise vacuum and temperature treatment of the soot tube inside the vitrification furnace, a release of metastable OH groups is achieved prior to the subsequent vitrification, which will be explained in more detail in the following.

Vitrification

Vitrification is carried out directly following the described pretreatment in the same vitrification furnace in that the soot tube is now supplied in reverse order, i.e. starting with the upper end, continuously from the bottom to the top to the heating element at a feed rate of 10 mm/min and is heated therein zonewise. The temperature of the heating element is preset to 1600° C., whereby a maximum temperature of about 1580° C. is observed on the surface of the soot tube. The internal pressure inside the vitrification furnace is kept at 0.1 mbar during vitrification by continuous evacuation. The jacket tube obtained by vitrification has an outer diameter of 180 mm, an inner diameter of 50 mm, and a length of 2500 mm.

Elongation

In a subsequent process step, the jacket tube is elongated in an electrically heated furnace under an inert gas atmosphere at a controlled internal pressure to an outer diameter of 90 mm and an inner diameter of 30 mm. A suitable elongation method is e.g. described in DE-A 195 36 960. During elongation the jacket tube is subdivided into suitable production lengths, in this instance, into partial lengths of 2 m.

Results of the Measurements of the OH Content

Subsequently, the hydroxyl group content of the jacket tube is determined after elongation. To this end an annular sample (disk) is taken from one end of the tube and the OH content is measured by spectroscopy at nine measuring points (measuring distance=5 mm), each being evenly distributed over the circumference of the sample. A mean OH content of 1.0 wt ppm was measured. This content is substantially identical with the integrated OH content measured over the whole length of the jacket tube.

To determine the amount of metastable OH groups in the measured total hydroxyl group content, the annular disk is subjected to an annealing treatment as explained above with reference to Example 1. The subsequent measurement of the OH content yielded a difference over the value prior to annealing of 0.02 wt ppm, which approximately corresponds to the amount of metastable OH groups in the jacket tube (see Table 1, Example 3).

Since the jacket tube is only heated for a short period of time during elongation, which has hardly an effect on the OH content, the OH contents determined in the elongated jacket tube are substantially identical with those prior to elongation.

Use of the Jacket Tube According to the Invention

The jacket tube according to the invention is used for producing a preform for an optical fiber. To this end it is collapsed onto a core rod which has a ratio of $d_M/d_K$ of 4.5. An optical fiber with a diameter of 125 μm is drawn from the resulting preform by way of a standard drawing method, the fiber being characterized by an optical attenuation of less than 0.30 dB/km at a wavelength of 1.385 μm.

TABLE 1

| No. | Sample | Outer- Θ [mm] | Inner- Θ [mm] | Length [mm] | Dehydration treatment | | | Pretreatment | | Metastable OH-content [wtppm] | Anneal stable OH-content [wtppm] | Total OH-content [wtppm] |
|---|---|---|---|---|---|---|---|---|---|---|---|---|
| | | | | | atm. | t [h] | T [° C.] | t [h] | T [° C.] | | | |
| 1 | Jacket tube | 150 | 50 | 2500 | Cl$_2$ | 6 | 800–900 | 200 | 1040 | 0.03 | 0.32 | 0.35 |
| | Annular disk | 150 | 50 | 10 | | | | | | 0.00 | 0.32 | 0.32 |
| 2 | Jacket tube | 150 | 50 | 2500 | Cl$_2$ | 6 | 800–900 | — | — | 0.13 | 0.32 | 0.45 |
| | Annular disk | 150 | 50 | 10 | | | | 200 | 1040 | 0.00 | 0.32 | 0.32 |
| 3 | Jacket tube | 90 (180) | 30 (50) | 2000 (2500) | Cl$_2$ | 6 | 850 | 1 | 1180 | 0.02 | 0.98 | 1.00 |
| | Annular disk | 90 | 30 | 10 | Cl$_2$ | 6 | 850 | 1 | 1180 | 0.00 | 0.98 | 0.98 |

Outer Θ = outer diameter;
inner Θ = inner diameter;
atm. = atmosphere during dehydration treatment;
t = duration of the treatment;
T = temperature during treatment

The invention claimed is:

1. A jacket tube comprising synthetically produced quartz glass, said jacket tube being made as a semi-finished product configured to be used for producing an outer cladding glass layer of an optical fiber, wherein the quartz glass has a content of metastable OH groups of less than 0.05 wt ppm and a content of anneal-stable OH groups of at least 0.05 wt ppm.

2. The jacket tube according to claim 1, wherein the quartz glass has a content of metastable OH groups of less than 0.01 wt ppm.

3. The jacket tube according to claim 1, wherein the quartz glass has a content of anneal-stable OH groups of not more than 5 wt ppm.

4. The jacket tube according to claim 3, wherein the quartz glass has a content of anneal-stable OH groups of not more than 1 wt ppm.

5. The jacket tube according to claim 3, wherein the quartz glass has a content of anneal-stable OH groups of not more than 0.5 wt ppm.

6. The jacket tube according to claim 1, wherein the quartz glass has a content of anneal-stable OH groups of at least 0.1 wt ppm.

7. The jacket tube according to claim 6, wherein the quartz glass has a content of anneal-stable OH groups of at least 0.3 wt ppm.

8. The jacket tube according to claim 1, wherein it has a ratio of outer diameter to inner diameter in the range between 2 and 8, preferably between 4 and 6.

9. An optical fiber comprising a core having a diameter $d_K$ and a first cladding region cladding the core and having an outer diameter $d_M$, and a second cladding region cladding the first cladding region, the ratio of $d_M/d_K$ being at least 2.5, wherein the second cladding region consists of synthetic quartz glass obtained by elongation of a jacket tube according to claim 1.

* * * * *